US008474851B2

(12) United States Patent
Schwartz

(10) Patent No.: US 8,474,851 B2
(45) Date of Patent: Jul. 2, 2013

(54) SUSPENDED RIDER BICYCLE

(76) Inventor: David M. Schwartz, Fair Oaks, CA (US)

(*) Notice: Subject to any disclaimer, the term of this patent is extended or adjusted under 35 U.S.C. 154(b) by 0 days.

(21) Appl. No.: 13/548,639

(22) Filed: Jul. 13, 2012

(65) Prior Publication Data
US 2013/0015635 A1 Jan. 17, 2013

Related U.S. Application Data

(60) Provisional application No. 61/507,827, filed on Jul. 14, 2011.

(51) Int. Cl.
B62J 1/28 (2006.01)

(52) U.S. Cl.
USPC ......................................................... 280/290

(58) Field of Classification Search
USPC .................. 280/290; 172/900, 431, 370, 257
See application file for complete search history.

(56) References Cited

U.S. PATENT DOCUMENTS

| 636,108 | A | * | 10/1899 | Blackman | 280/290 |
| 1,254,858 | A | * | 1/1918 | Shmelstein | 296/98 |
| 4,754,532 | A | * | 7/1988 | Thomson et al. | 24/303 |
| 4,813,706 | A | * | 3/1989 | Kincheloe | 280/756 |
| 5,383,675 | A | * | 1/1995 | Liebert | 280/266 |
| 5,607,172 | A | * | 3/1997 | Turi | 280/290 |
| 5,743,561 | A | * | 4/1998 | Kim | 280/756 |
| 6,086,079 | A | * | 7/2000 | Farina | 280/261 |
| 6,142,253 | A | * | 11/2000 | Mueller et al. | 180/219 |
| D506,164 | S | * | 6/2005 | Barbosa | D12/111 |
| 7,017,931 | B1 | * | 3/2006 | Hines | 280/290 |
| 7,255,360 | B2 | * | 8/2007 | Bever | 280/290 |
| 7,900,940 | B1 | * | 3/2011 | Vidmar | 280/87.021 |
| 2010/0133767 | A1 | | 6/2010 | Arney | |

FOREIGN PATENT DOCUMENTS

| EP | 1215112 A2 | * | 6/2002 |
| GB | 2413257 A | * | 10/2005 |
| JP | 02159217 A | * | 6/1990 |

OTHER PUBLICATIONS

Street Flyer: A Hang Glyder for the Ground http://www.wired.com/gadgetlab/2011/02/street-flyer-a-hang-glider-for . . . .

* cited by examiner

Primary Examiner — Paul N Dickson
Assistant Examiner — Daniel Yeagley
(74) Attorney, Agent, or Firm — Shoemaker and Mattare

(57) ABSTRACT

A suspended rider bicycle has a suspension boom which extends from the frame above the rider's torso, and a suspension device such as a belt or sling for suspending the rider's torso from the suspension boom.

4 Claims, 5 Drawing Sheets

SUSPENDED RIDER BICYCLE

This application claims benefit of provisional patent application 61/507,827, filed Jul. 14, 2011.

BACKGROUND OF THE INVENTION

This invention relates to a bicycle from which a rider, rather than sitting on a seat, is suspended from a boom extending from the frame of the bicycle.

Ever since the invention of the first two-wheeled bicycle in the fifteenth century C.E., bicycles have had a seat for the rider. While this is an obvious method of support, providing easy mounting and dismounting, it has two major drawbacks: riders suffer from the concentrated application of pressure on their crotch and buttocks areas, which can lead to serious health problems, and while pedaling with all body weight supported by the pedals, kinetic energy is lost due to unconstrained vertical motion of the rider's body.

All existing and past bicycle designs support the rider from the underside of his body, whether standing on the pedals or sitting on the seat. Seats have been provided on various parts of the bicycle frame, including the top of the center post, on the frame's top crossbar between the front and rear wheels and on the frame's bottom crossbar. This is the case with many recumbent bicycle designs. Bicycles without any seat have depended on the rider standing on pedals or a foot bar or—in the case of the earliest wooden bicycles lacking any propulsion system—on the top frame's crossbar itself, like straddling a fence. Although standing on one's feet or sitting in or on a seat is natural to human anatomy, it is not the most anatomically beneficial or energy-efficient way to integrate a person with a human-powered two-wheeled machine.

In the most common configuration of modern bicycles, the seat is mounted atop the center post of the frame. While coasting, virtually the entire weight of the rider is supported by less than 12 square inches of seat area. Consequently, an average weight male rider experiences over 17 pounds per square inch of pressure concentrated on the crotch region. On small racing-style seats, the pressure can be doubled. Several hours of pressure in this range can cause discomfort and pain. An all-day ride can result in permanent nerve damage in this area of the body. In addition, the nose of the seat can cause inner thigh chafing.

Recumbent bicycles overcome the "pressure point" problem of a small center post mounted seat by having a seat with a larger surface area that better supports the buttocks. These seats do not have noses, so inner thigh chafing is not a problem. However, the forward edge of the recumbent bicycle seat can create a pressure ridge across the underside of the thigh. This line of pressure is exacerbated by the up and down motion of the upper leg while pedaling.

From an energy efficiency perspective, recumbent bicycles offer the advantage of little loss of energy for lower body support. In contrast, conventional bicycles require a significant portion of the rider's energy simply to oppose gravity while pedaling. Also, in sprint mode, when the rider's weight is fully on the pedals, the pedaling motion itself causes the rider's body to oscillate vertically. This vertical motion contributes nothing to the forward momentum of the bicycle. It represents wasted energy.

It has been calculated that a 170-lb rider, during a 3-minute intense uphill ride with 75% of their body weight applied to the pedals would produce over 2700 joules just by lifting their body a half inch on each stroke. That is the wasted work this invention aims to capture, by restraining vertical motion.

SUMMARY OF THE INVENTION

An object of the invention is to improve the efficiency of bicycles.

Another object is to avoid the discomfort caused by high contact pressures with a conventional bicycle seat.

These and other objects are attained by a bicycle as shown in the drawings and described below.

The invention addresses both the anatomical, health-related problems of conventional bicycle design as well as its energy inefficiencies. It uses a detachable harness, similar to the ones used in hang gliders to distribute the rider's weight to the top frame member or members. The body weight of the average rider is spread out over an area of at least 72 square inches; less than 3 pounds per square inch at the natural balance point of the human body: the hips, across the pelvis. Only a very small amount of energy is required for lateral balance, which is naturally expended through the hands, arms and shoulders as the rider grips the handlebar.

The invention reduces to a minimum the vertical oscillation energy loss caused by standing and pedaling a conventional bicycle. Instead, a reaction force is created between the top frame member or members and the rider's body. This reaction force effectively captures the energy that would have been lost through vertical oscillation of the body.

Furthermore, because the present design provides a vertical reaction plate behind the harness, the rider may choose to exert pressure on it to increase force on the pedals beyond what he could when the body was essentially unconstrained vertically on a conventional bicycle frame. In concept, this is similar to what a person can do to move a heavy object like a sofa by sitting on the floor with back to the wall and legs bent. By using the wall as a reaction plate, the force of leg extension can be effectively harnessed to push the sofa. This constraint captures kinetic energy that would otherwise be lost to vertical motion of the rider's mass and converts it into rotational force at the crankshaft. In effect, the rider can use the reaction plate as a leverage point.

Four versions of the new frame concept are described below: a lateral hoop design, a full longitudinal hoop design, a short longitudinal hoop design, and a cantilevered arm design. In all of these designs, the rider's body is suspended by a fabric harness that has seatbelt-type buckles for quick adjustments, attachment and release. The harness distributes the rider's weight over a relatively large area that can encompass the rider's torso and pelvis, depending on the geometry of the harness.

With the full longitudinal hoop design, rider safety is enhanced versus conventional frames. The structural hoop can act as a full or partial roll cage (full cage, with the addition of a lateral hoop) and also serve to hold airbags that would deploy in the event of a collision or severe fall.

BRIEF DESCRIPTION OF THE DRAWINGS

In the accompanying drawings.

DESCRIPTION OF THE PREFERRED EMBODIMENTS

Figure 1:
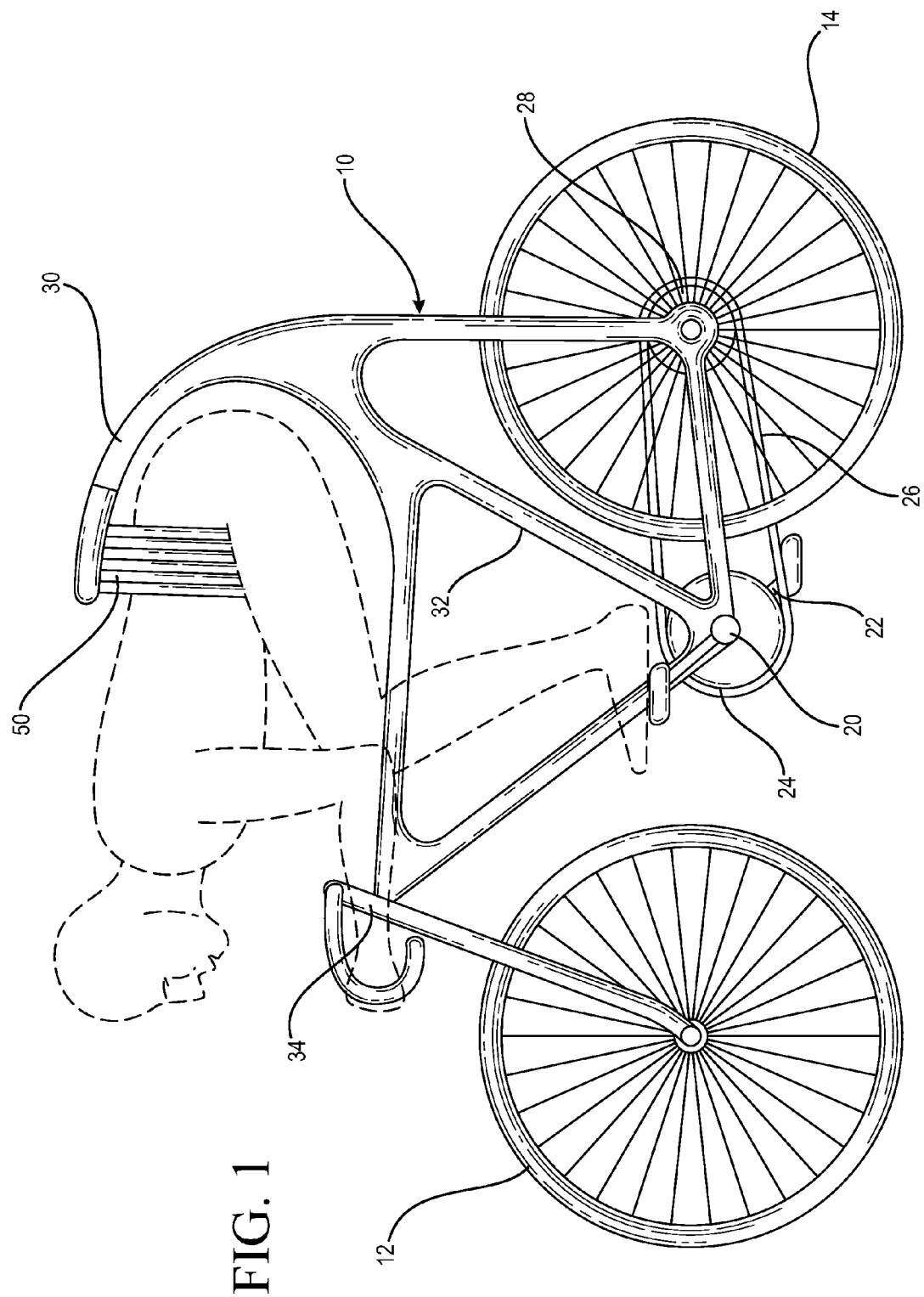
FIG. 1 is a left side elevation of a bicycle embodying the invention.

Each of the bicycles shown in FIGS. 1-6 has a frame 10 supported by a pair of wheels 12, 14. The mounting shown is rigid, but a suspension (not shown) could be provided for one or both wheels.

The frame supports means for propelling at least one of the wheels, for example a convention pedal assembly, comprising a shaft 20 supported by bearings (not shown) at a bottom bracket, a pair of cranks 22, mounted to opposite ends of the shaft, at least one chain ring 24 attached to the shaft, and a chain 26 driven by the chain ring and driving a sprocket 28 connected to the rear wheel 14. While a pedal assembly is the presently preferred propelling means, other means, such as a motor, could be used instead of or in addition to the pedal assembly.

The frame shown is unconventional in that it is seatless. In lieu of a seat, the rider is suspended from a suspension boom which extends above him.

In the embodiment of FIG. 1, the suspension boom 30 is formed as an extension of the "seat" tube 32. The boom is attached to or formed integrally with the frame, extending upward from the rear of the frame and above the back of the rider. The frame is otherwise fairly conventional.

Figure 2:
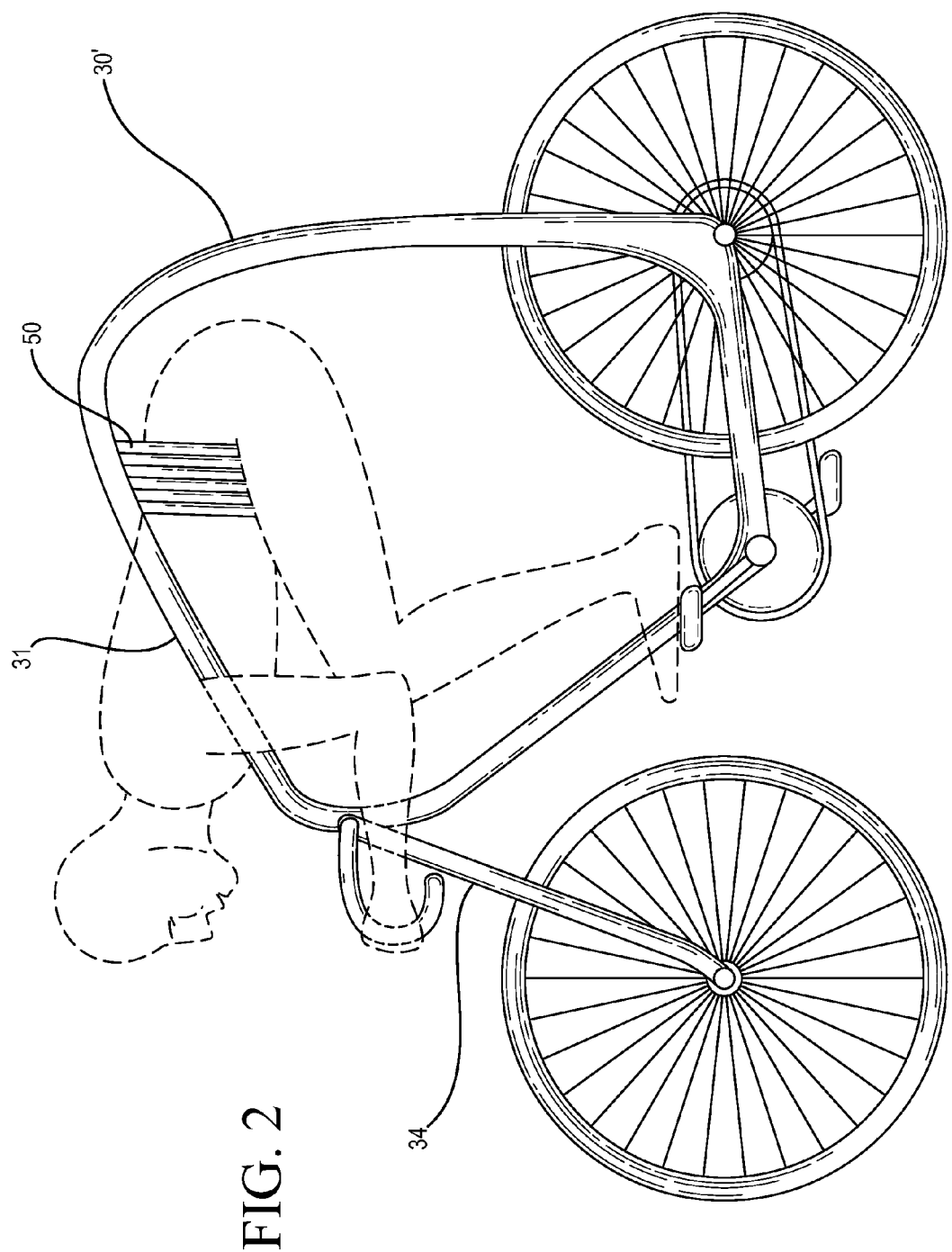
FIG. 2 is a left side elevation of a second embodiment of the invention.
Figure 3:
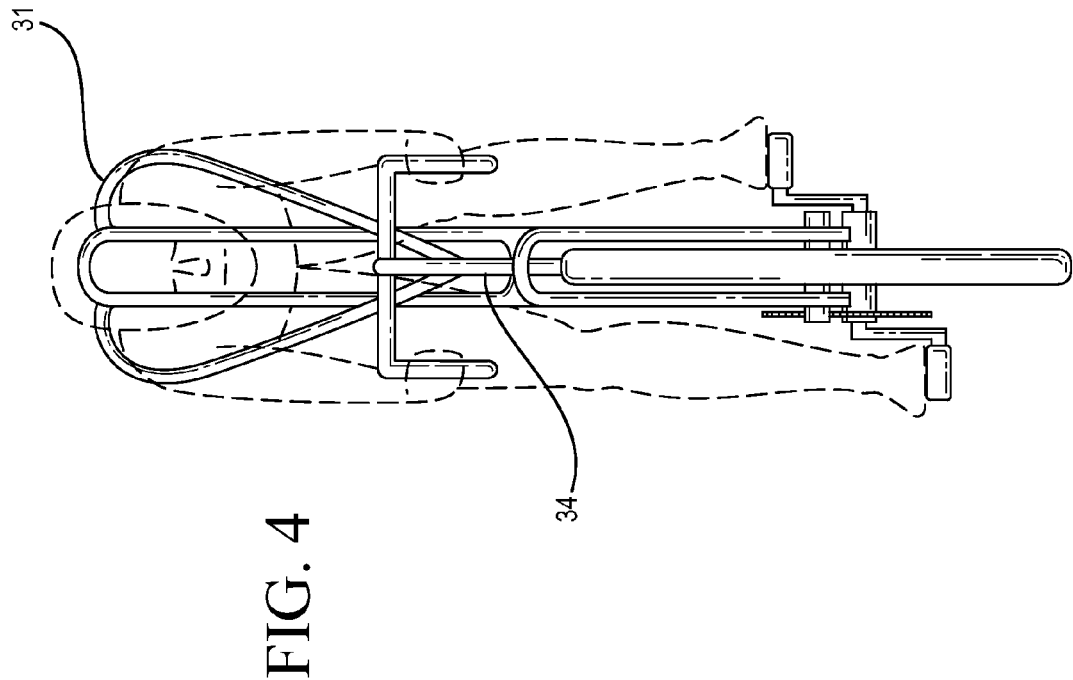
FIG. 3 is a rear elevation thereof.
Figure 4:
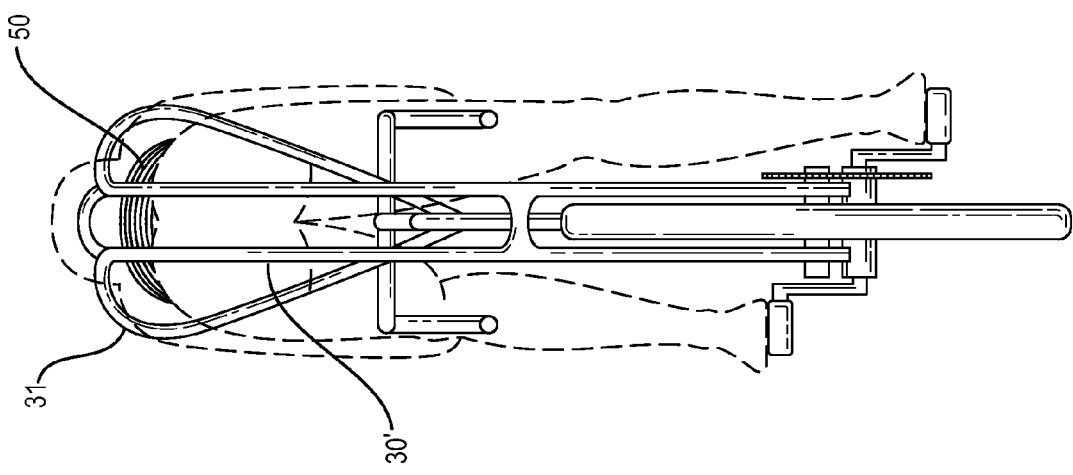
FIG. 4 is a front elevation thereof.

In the embodiment of FIGS. 2-4, the frame 10 envelops the rider, and the seat tube is eliminated. In this case, the suspension boom 30' comprises a laterally spaced pair of tubes (see FIG. 3), extending from the rear wheel behind and over the rider's buttocks. A forward extension 31 of the boom 30' extends to the head tube 34. The extension 31 includes a pair of tubes which diverge so as to pass on either side of the user's torso, then converge, passing between the rider's arms to a connection point at the front of the frame, preferably the head tube.

Figure 5:
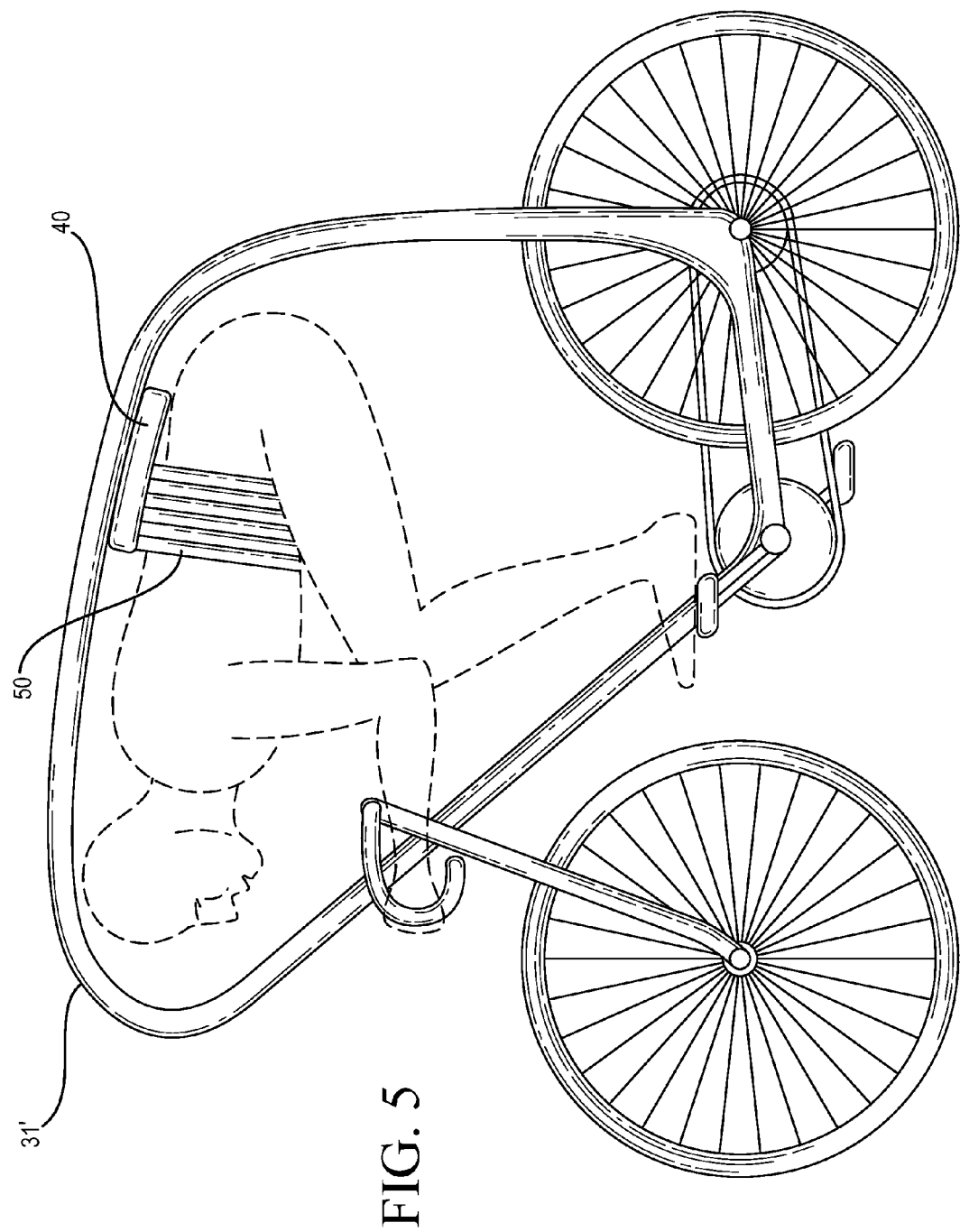
FIG. 5 is a left side elevation of a third embodiment of the invention.

In the embodiment of FIG. 5, the tubes of the forward extension 31' do not diverge, but rather extend over the rider's head to protect him from falls.

Figure 6:
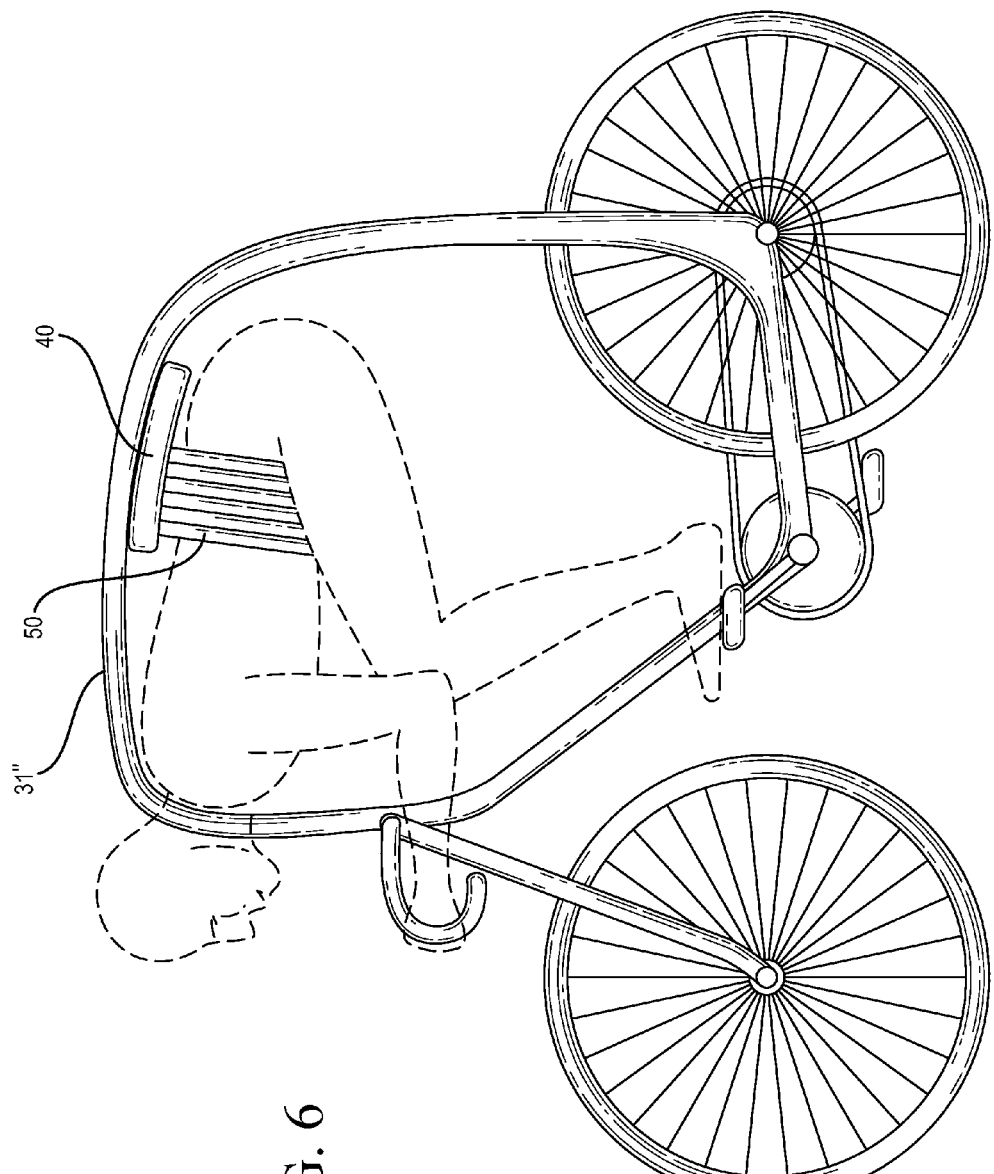
FIG. 6 is a left side elevation of a fourth embodiment of the invention.

In the embodiment of FIG. 6, the forward extension 31" of the suspension boom comprises two tubes which extend over the rider's shoulders and on either side of his neck to a connection point at the head tube.

In each embodiment, a structure such as a reaction plate 40 may be attached to or formed as part of the frame, to support the lower back during hard pedaling.

In each embodiment, the rider is suspended from the upper frame portion by suspension member 50 such as a sling or belt.

The rider can be suspended from the bicycle's suspension boom in different ways. For example, the suspension member 50 can be a fabric belt:

(a) attached to the reaction plate at the frame, with overlapping ends that have Velcro strips to connect at the overlap; or
(b) attached to the reaction plate at the frame, with metal or plastic snap-lock buckles, similar to hiking backpack strap attachments; or
(c) worn by the rider with a magnetic plate at the back that couples to a magnetic plate on the bicycle's boom; or
(d) worn by the rider, with a hook at the back that locks into a socket in the reaction plate and requires manual release by the rider.

Additional features may be added. For example, the frame tubes can carry or incorporate airbags which inflate automatically to protect the rider's torso and/or head in case the bicycle falls over while in motion. Solid-state sensors can be used to detect when the airbags should be deployed.

In those embodiments in which the suspension boom passes over or around the rider to a connection point at the front of the bicycle, connection points may be provided for the mounting of a fairing. In a conventional design, the area of attachment is limited to the head tube, whereas with the present design, there are three points for attachment: the head tube, plus both tubes making up the boom.

In embodiments where the suspension boom passes over the rider's back as well as the rider's head, and meet at head tube, a top half-fairing may be connected to, or formed as part of, the suspension boom, further improving aerodynamics of the rider-bicycle pair.

It should be understood that while the preferred embodiments of this invention are all seatless, the invention does not depend on the absence of a seat, and versions of the invention in which there is a conventional seat as well as a suspension device are possible. For example, if the suspension device has a magnetic attachment to the boom, the rider could alternate riding positions, between the seat and the suspension device.

Since the invention is subject to modifications and variations, it is intended that the foregoing description and the accompanying drawings shall be interpreted as only illustrative of the invention defined by the following claims.

I claim:

1. A suspended rider bicycle comprising
    a frame,
    a pair of wheels supporting the frame,
    a suspension boom, formed integrally with the frame, which extends from the frame above the rider's torso, wherein the suspension boom has forward and rearward ends, the rearward end being connected to the frame at a rear end thereof, and the forward end being connected to the frame at a front end thereof,
    a suspension device for suspending the rider's torso from said suspension boom, and
    a reaction plate supported by the frame, to support the lower back during hard pedaling.

2. The suspended rider bicycle of claim 1, wherein said suspension device is a belt or sling having a portion which can pass around the torso of a rider, and a portion which is connected to the suspension boom.

3. The suspended rider bicycle of claim 1, wherein the suspension boom comprises a pair of tubes which diverge at a point above the rider's torso, and pass around his torso behind his shoulders.

4. The suspended rider bicycle of claim 1, wherein the suspension boom comprises a pair of tubes which diverge at a point above the rider's torso, passing over the shoulders and around the neck of the rider.

* * * * *